United States Patent
Kim

(10) Patent No.: US 8,374,549 B2
(45) Date of Patent: Feb. 12, 2013

(54) METHOD FOR ALTERING COMMUNICATION MODE AND MOBILE COMMUNICATION TERMINAL USING THE SAME

(75) Inventor: Hyun Sik Kim, Su-won (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1138 days.

(21) Appl. No.: 12/070,836

(22) Filed: Feb. 21, 2008

(65) Prior Publication Data

US 2008/0280636 A1 Nov. 13, 2008

(30) Foreign Application Priority Data

May 11, 2007 (KR) .................. 10-2007-0045768

(51) Int. Cl.
*H04B 7/00* (2006.01)
(52) U.S. Cl. ............... 455/41.2; 455/418; 455/552.1; 455/553.1; 455/517; 455/518; 709/208; 709/209
(58) Field of Classification Search .......... 455/418–420, 455/41.2, 445, 11.1, 500, 502, 74, 74.1, 552.1, 455/553.1, 569.1, 569.2, 517, 518; 709/208, 709/209

See application file for complete search history.

(56) References Cited

U.S. PATENT DOCUMENTS

| | | | |
|---|---|---|---|
| 6,590,928 B1 * | 7/2003 | Haartsen .................. | 375/134 |
| 6,697,638 B1 * | 2/2004 | Larsson et al. ............ | 455/553.1 |
| 7,437,183 B2 * | 10/2008 | Makinen ................... | 455/569.1 |
| 7,603,145 B2 * | 10/2009 | Zinn et al. ................. | 455/574 |
| 7,693,511 B2 * | 4/2010 | Bottrich et al. ........... | 455/417 |
| 2003/0114176 A1 * | 6/2003 | Phillipps .................. | 455/500 |

* cited by examiner

*Primary Examiner* — Tuan A Tran

(57) ABSTRACT

A method is disclosed that alters a communication mode in a mobile communication terminal. The method includes: if the mobile communication terminal receives a connection signal for an external device, determining whether the communication mode is set to a bidirectional mode; if the communication mode is not a bidirectional mode, determining whether the communication mode is set to a unidirectional mode; and if the communication mode is a unidirectional mode, paging with the external device. The mobile communication terminal can reduce its power consumption and thus extends its remaining run time.

20 Claims, 3 Drawing Sheets

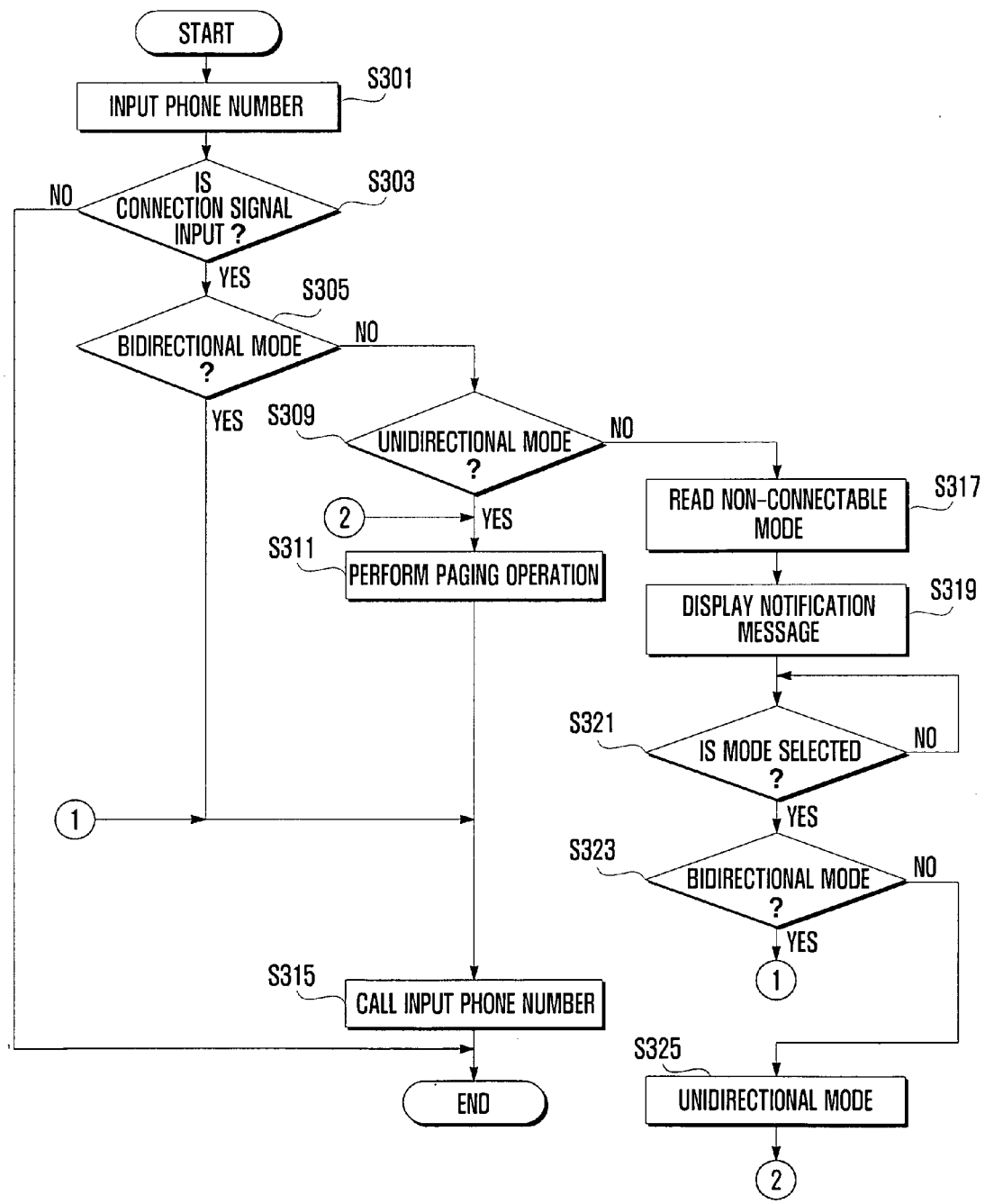

METHOD FOR ALTERING COMMUNICATION MODE AND MOBILE COMMUNICATION TERMINAL USING THE SAME

CROSS-REFERENCE TO RELATED APPLICATION(S) AND CLAIM OF PRIORITY

This application claims priority to an application entitled "METHOD FOR ALTERING COMMUNICATION MODE AND MOBILE COMMUNICATION TERMINAL USING THE SAME" filed in the Korean Intellectual Property Office on May 11, 2007 and assigned Serial No. 2007-0045768, the contents of which are incorporated herein by reference.

TECHNICAL FIELD OF THE INVENTION

The present invention relates to a mobile communication terminal and, more particularly, to a method that alters communication modes to reduce the power consumption of a mobile communication terminal. Also this invention relates to a mobile communication terminal using the method.

BACKGROUND OF THE INVENTION

With the development of mobile communication terminals, data communication technology using wireless communication units is enhanced. In order to perform wireless communication, the mobile communication terminal receives a request signal transmitted from an external device (for example, a mobile communication network for wireless communication or an external Bluetooth device for Bluetooth communication) at certain intervals. The interval may be set at various time periods (e.g., 1.28 sec, 2.56 sec, etc.). The mobile communication terminal performs a page scan to receive the request signal from the external device.

When the mobile communication terminal has performed the page scan and a communication mode is set, the mobile communication terminal consumes more power when the communication mode is in a set state than when the communication mode is not set. Therefore, the mobile communication terminal has a disadvantage in that its run time is shortened.

SUMMARY OF THE INVENTION

To address the above-discussed deficiencies of the prior art, it is a primary object of the present invention to solve the above problems, and therefore, the present invention provides a method that alters a communication mode to minimize power consumption arising from page scanning performed by a mobile communication terminal, and provides a mobile communication terminal using the method.

In accordance with an exemplary embodiment of the present invention, there is a provided a method for altering a communication mode of a mobile communication terminal, including: if the mobile communication terminal receives a connection signal for an external device, determining whether the communication mode is set to a bidirectional mode; if the communication mode is not a bidirectional mode, determining whether the communication mode is set to a unidirectional mode; and if the communication mode is a unidirectional mode, paging with the external device.

In accordance with another exemplary embodiment of the present invention, there is a provided a mobile communication terminal including: a communication unit for communicating with an external device; an input unit for inputting a connection signal from the external device and setting a communication mode of the communication unit; and a controller for determining the communication mode when receiving the connection signal from the input unit and or paging with the external device if the communication mode is a unidirectional mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a flow chart describing a method for performing wireless communication in a communication mode, which is set by the method according to another embodiment of the present invention.

DETAILED DESCRIPTION OF THE INVENTION

Figure 1:
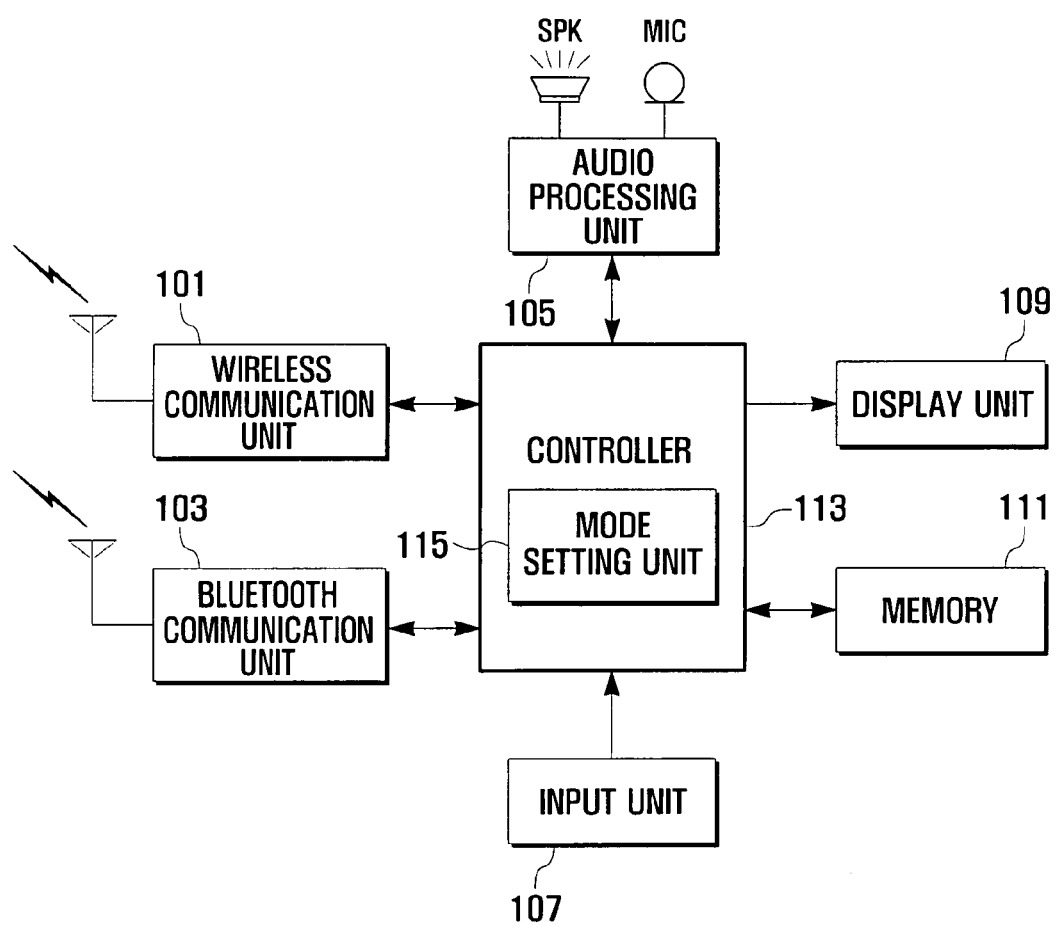
FIG. 1 is a schematic block diagram illustrating a mobile communication terminal according to an embodiment of the present invention.
Figure 2:
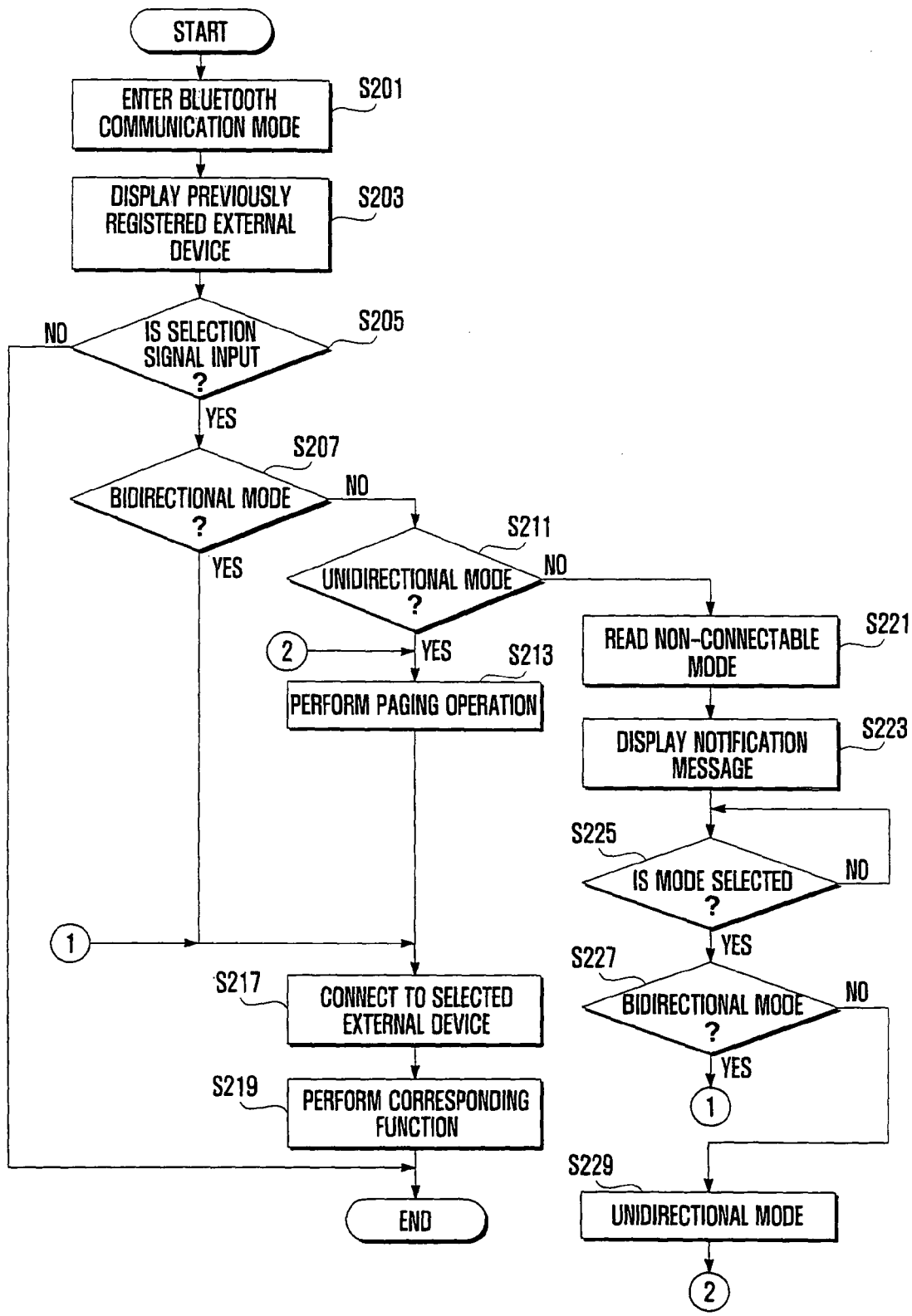
FIG. 2 is a flow chart describing a method for performing Bluetooth communication in a communication mode, which is set by the method according to an embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Although the embodiment according to the present invention is described based on a mobile communication terminal that can perform communication based on communication modes, it will be appreciated that the mobile communication terminal can be applied to all information communication devices, multimedia devices, and their applications, such as, portable terminals, mobile phones, personal digital assistants (PDAs), smart phones, and laptop computers.

In addition, although the short-range wireless communication according to an embodiment of the present invention is described based on Bluetooth communication, it will be appreciated that wireless communication is not limited to the Bluetooth communication, but rather can be applied to all wireless communications with the ability to perform a paging operation to connect to external devices.

Furthermore, the bidirectional mode according to an embodiment of the present invention is referred to as a mode where a communication unit performs a page scan at a certain period to receive a request signal transmitted from an external device. The unidirectional mode is referred to as a mode where a communication unit does not perform a page scan but pages with an external device, thereby connecting to the external device. A non-connectable mode is referred to as a mode where a communication unit does not perform a page scan or paging because power supplied to the communication unit is interrupted.

FIG. 1 is a schematic block diagram illustrating a mobile communication terminal according to an embodiment of the present invention.

Referring to FIG. 1, the mobile communication terminal includes: communication units composed of a wireless communication unit 101 and a Bluetooth communication unit 103; an audio processing unit 105; an input unit 107; a memory 111; and a controller 113.

The wireless communication unit 101 communicates wirelessly with a mobile communication terminal and a mobile communication network. For example, the wireless communication unit 101 transmits and receives voice data, text messages, and multi-media messages through the mobile communication network.

The Bluetooth communication unit 103 performs Bluetooth communication via a Bluetooth communication link established according to the Bluetooth protocol with external Bluetooth devices through a Bluetooth antenna. Here, the external Bluetooth device means a device that provides a Bluetooth capability, such as a mobile communication terminal, a Bluetooth headset, a Bluetooth car kit, or the like, and is hereinafter referred to as an external device. In particular, the Bluetooth communication unit 103 stores a host stack that controls Bluetooth communication, a Bluetooth profile that defines requirements to allow external Bluetooth devices to communicate there between, application programs, and the like. The Bluetooth profile includes a Hands-Free (HF) Profile to support a hands-free unit, a headset (HS) profile to support a headset, and a Cordless Technology Profile (CTP) to support a cordless phone. The profiles may be selectively employed according to the external Bluetooth device connected to the mobile communication terminal.

The audio processing unit 105 converts an analog audio signal input by a microphone (MIC) into a digital audio signal to be output to the controller 113. The audio processing unit 105 converts a digital audio signal, which is received by the wireless communication unit 101 and processed by the controller 113, into an analog signal to be output through a speaker SPK.

The input unit 107 is implemented by a keypad. The input unit 107 may be implemented by a touch screen, a touch pad, or a scroll wheel, or the like. The input unit 107 serves to output a key input signal of a user to the controller 113 to control operations of the mobile communication terminal. The input unit 107 includes a selection key for selecting an external device to perform Bluetooth communication.

The display unit 109 displays operation states, operations results, and a variety of information, which are generated as the mobile communication terminal is operated under the control of the controller 113. The display unit 109 may be implemented by display devices, such as a liquid crystal display (LCD) and an organic light emitting diode (OLED), etc. When the mobile communication terminal enters a Bluetooth communication mode according to the control of the controller 113, the display unit 109 displays a list of external devices previously registered in the memory 111.

The memory 111 stores programs through which the controller 113 controls the mobile communication terminal and information related to operations of the mobile communication terminal, for example, setting states and setting menu, and the like. The memory 111 stores Bluetooth addresses (BT_ADDR) and pin codes (PIN_CODE) of external devices previously registered in the mobile communication terminal. The memory 111 stores communication modes set in the mobile communication terminal.

The controller 113 serves to control the entire operation of the mobile communication terminal. The controller 113 may include a modem and codec that encodes and decodes signals transmitted and received by the wireless communication unit 101.

The controller 113 includes a mode setting unit 115 that sets communication modes of the mobile communication terminal. The mode setting unit 115 sets the communication mode of the mobile communication terminal to a bidirectional mode, unidirectional mode, or non-connectable mode according to key input signals of the input unit 107. The communication mode is altered between the wireless communication unit 101 and the Bluetooth communication unit 103.

FIG. 2 is a flow chart describing a method for performing Bluetooth communication in a communication mode, which is set by the method according to an embodiment of the present invention.

Referring to FIGS. 1 and 2, the controller 113 enters a Bluetooth communication mode (S201), and displays previously registered external devices on the display unit 109 (S203). The external devices denote external Bluetooth devices that have been previously registered in the memory 111 by the controller 113 before Bluetooth communication is performed.

When the controller 113 inputs a signal for selecting the external devices displayed at step S203 from the input unit 107 (S205), the controller 113 determines whether the communication mode of the Bluetooth communication unit 103, which is previously set by the mode setting unit 115, is a bidirectional mode to perform Bluetooth communication with the selected external device (S207).

Here, the determination of whether the communication mode is the bidirectional mode can be decided by the communication mode that has been previously set by the mode setting unit 115. Also, the determination can be decided by performing a page scan where the Bluetooth communication unit 103 receives a request signal transmitted from the external device at a certain period.

When the controller 113 determines that the communication mode of the Bluetooth communication unit 103 is a bidirectional mode at step S207, the controller 113 proceeds with step S217.

On the contrary, when the controller 113 determines that the communication mode is not a bidirectional mode at step S207, the controller 113 determines whether the communication mode is a unidirectional mode (S211).

When the controller determines that the communication mode is a unidirectional mode at step S211, the controller 113 controls the Bluetooth communication unit 103 so that it can page with the external device that is selected at step S205

(S213). Here, in the unidirectional mode, the controller 113 does not perform a page scan to receive a request signal transmitted from the external device, so the Bluetooth communication unit 103 cannot receive any signal from the external device. Since the page scan is not conducted, the mobile communication terminal can reduce its power consumption. Afterwards, the controller 113 proceeds with step S217.

On the contrary, when it is determined that the communication mode is not a unidirectional mode at step S211, the controller 113 reads that the communication is a non-connectable mode (S221).

If the set communication mode is a non-connectable mode, the controller 113 displays a notification message on the display unit 109, notifying that the mobile communication terminal cannot perform Bluetooth communication with the external device (S223). The notification message includes a selection message to alter the communication mode of the Bluetooth communication unit 103.

When the controller 113 inputs the selection signal from the input unit 107 (S225), it determines whether the selected communication mode is a bidirectional mode (S227). If the controller 113 determines that the selected communication mode is a bidirectional mode at step S227, it proceeds with step S217. Here, the controller 113 alters the communication mode to a bidirectional mode and performs a page scan (not shown).

On the contrary, when the controller 113 determines that the selected communication mode is not a bidirectional mode at step S227, it reads that the selected communication mode corresponds to a unidirectional mode (S229) and proceeds with step S213. Here, the controller 113 pages with the external device at step S213.

Meanwhile, at step S217, the controller 113 performs Bluetooth communication with an external device corresponding to the selection signal of step S205. The controller 113 then performs a corresponding operation with the external device (S219). The corresponding operation includes data transmitting/receiving, etc.

FIG. 3 is a flow chart describing a method for performing wireless communication in a communication mode, which is set by the method according to another embodiment of the present invention.

Referring to FIGS. 1 and 3, the controller 113 displays numbers (e.g., a phone number) corresponding to the input keys of the input unit 107 on the display unit 109 (S301). When the controller 113 inputs a connection signal of the displayed phone number from the input unit 107 (S303), it determines whether the communication mode of the wireless communication unit, which is previously set by the mode setting unit 115, is a bidirectional mode in order to perform wireless communication with the external device corresponding to the phone number (S305).

Here, the determination of whether the communication mode is the bidirectional mode can be decided by the mode setting unit 115. Also, the determination can be confirmed by performing a page scan where the wireless communication unit 101 receives a request signal transmitted from the external device at a certain period.

When the controller 113 determines that the communication mode is a bidirectional mode at step S305, it proceeds with step S315.

On the contrary, when the controller determines that the communication mode is not a bidirectional mode at step S305, it determines whether the communication mode is a unidirectional mode (S309).

When the controller 113 determines that the communication is a unidirectional mode at step S309, it controls the wireless communication unit 101 so that it can page with the external device (i.e., a mobile communication network) which corresponds to the phone number of step S303 (S311). Here, in the unidirectional mode, the controller 113 does not perform a page scan to receive a request signal transmitted from the external device, so the wireless communication unit 101 cannot receive any signal from the external device. Since the page scan is not conducted, the mobile communication terminal can reduce its power consumption. After that, the controller 113 proceeds with step S315.

On the contrary, when the controller determines that the communication mode is not a unidirectional mode at step S309, it reads that the communication mode is a non-connectable mode (S317).

Since the set communication mode is a non-connectable mode, the controller 113 displays a notification message on the display unit 109, notifying that the mobile communication terminal cannot perform wireless communication with the external device (S319). The notification message includes a selection message to alter the communication mode of the wireless communication unit 101.

When the controller 113 inputs the selection signal from the input unit 107 (S321), it determines whether the selected communication mode is a bidirectional mode (S323). If the controller 113 determines that the selected communication is a bidirectional mode at step S323, it proceeds with step S315. Here, the controller 113 alters the communication mode to a bidirectional mode and performs a page scan (not shown).

On the contrary, when the controller 113 determines that the selected communication mode is not a bidirectional mode at step S323, it reads that the selected communication mode corresponds to a unidirectional mode and proceeds with step S311. Here, the controller 113 pages with the external device at step S311.

Meanwhile, at step S315, the controller 113 controls the wireless communication unit 101 so that it can transmit a call to the external device corresponding to the phone number input at step S301.

As described in the foregoing, the mobile communication terminal according to the present invention can alter its communication mode to communicate with an external device, according to a user's request, thus reducing its power consumption and extending its remaining run time.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for altering a communication mode of a mobile communication terminal, the method comprising:
when an external device is selected for establishing communication, determining whether the communication mode is set to one of a bidirectional mode for performing a scan to receive a signal from the external device and a unidirectional mode for not performing the scan;
when the communication mode is determined to be set to the bidirectional mode, performing a connection with the external device; and
when the communication mode is determined to be set to the unidirectional mode, paging the external device and subsequently performing a connection with the external device.

2. The method of claim 1, further comprising:
reading the communication mode as a non-connectable mode when the communication mode is determined to not be set to the bidirectional mode and not set to the unidirectional mode.

3. The method of claim 2, further comprising:
displaying a notification message that prompts for selection of the communication mode when the communication mode is read as the non-connectable mode; and
when the bidirectional mode is selected in response to notification message, connecting to the external device.

4. The method of claim 3, further comprising:
when the unidirectional mode is selected in response to the notification message, paging the external device.

5. The method of claim 4, further comprising:
after paging the external device, connecting to the external device.

6. The method of clam 3, wherein connecting to the external device is achieved by a communication unit, wherein the communication unit comprises at least one of a wireless communication unit and a Bluetooth communication unit.

7. The method of claim 6, when the communication unit comprises a Bluetooth communication unit, further comprising: displaying at least one of external devices that were registered with the mobile communication terminal.

8. The method of claim 7, wherein the connection signal is a selection signal to connect to at least one of the displayed external devices when the communication unit comprises the Bluetooth communication unit.

9. The method of claim 6, wherein the connection signal serves to connect a call with the external device, when the communication unit comprises the wireless communication unit.

10. A mobile communication terminal comprising:
a communication unit configured to communicate with an external device;
an input unit configured to select the external device for establishing communication; and
a controller configured to determine whether a communication mode is set to one of a bidirectional mode for performing a scan to receive a signal from the external device and a unidirectional mode for not performing the scan when the external device is selected for establishing communication, perform a connection with the external device when the communication mode is determined to be set to the bidirectional mode, and page the external device and subsequently perform a connection with the external device when the communication mode is determined to be set to the unidirectional mode.

11. The terminal of claim 10, wherein the controller comprises a mode setting unit configured to set the communication mode of the communication unit to one of at least the bidirectional mode, the unidirectional mode, and a non-connectable mode.

12. The terminal of claim 11, further comprising:
a display unit configured to display a user interface,
wherein the controller is further configured to control the display unit to display a notification message for selecting one of the bidirectional mode, the unidirectional mode, and the non-connectable mode for setting the communication mode.

13. The terminal of claim 12, wherein the controller is further configured to control the communication unit to connect with the external device when the bidirectional mode is selected in response to the notification message.

14. The terminal of claim 12, wherein the controller is further configured to control the communication unit to page the external device when the unidirectional mode is selected in response to the notification message.

15. The terminal of claim 14, wherein the controller is further configured to control the communication unit to connect with the external device after finishing paging with the external device.

16. The terminal of claim 11, wherein the communication unit comprises at least one of a wireless communication unit and a Bluetooth communication unit.

17. A method for communicating with an external device according to a communication mode of a mobile communication terminal, the method comprising:
determining the communication mode when a connection event for establishing communication with an external device is detected, the connection event comprising one of a user input and a communication function;
connecting to the external device in response to the connection event when the communication mode is set to a bidirectional mode; and
paging the external device in response to the connection event when the communication mode is set to a unidirectional mode,
wherein the unidirectional mode corresponds to a mode in which the mobile communication terminal does not periodically scan for request signals transmitted from external devices.

18. The method of claim 17, further comprising displaying a notification message that prompts for selection of one of the bidirectional mode and the unidirectional mode in response to the connection event when the communication mode is set to a non-connectable mode.

19. The method of claim 18, further comprising connecting to the external device when the bidirectional mode is selected in response to the notification message.

20. The method of claim 18, further comprising paging the external device when the unidirectional mode is selected in response to the notification message.

* * * * *